United States Patent
Ohta

[11] Patent Number: 5,428,695
[45] Date of Patent: Jun. 27, 1995

[54] OPTICAL NON-RECIPROCAL CIRCUIT OF WAVEGUIDE TYPE

[75] Inventor: Yoshinori Ohta, Tokyo, Japan

[73] Assignee: NEC Corporation, Tokyo, Japan

[21] Appl. No.: 287,883

[22] Filed: Aug. 9, 1994

[30] Foreign Application Priority Data

Aug. 9, 1993 [JP] Japan .................. 5-197175

[51] Int. Cl.[6] .................. G02B 6/12; G02B 6/10
[52] U.S. Cl. ..................... 385/14; 385/6; 385/11; 385/37; 385/39; 385/50; 385/131; 385/132
[58] Field of Search ............ 385/1, 2, 6, 7, 8, 9, 385/10, 11, 14, 15, 37, 27, 39, 50, 129, 130, 131, 132

[56] References Cited

U.S. PATENT DOCUMENTS

| | | | |
|---|---|---|---|
| 3,995,936 | 12/1976 | Hepner et al. | 385/6 X |
| 4,239,329 | 12/1980 | Matsumoto | 385/11 X |
| 4,645,293 | 2/1987 | Yoshida et al. | 385/132 X |
| 4,763,972 | 8/1988 | Papuchon et al. | 385/11 X |
| 4,849,080 | 7/1989 | Doorman et al. | 204/192.15 |
| 4,859,014 | 8/1989 | Schmitt et al. | 385/11 X |
| 5,031,983 | 7/1991 | Dillon, Jr. et al. | 385/11 X |
| 5,078,512 | 1/1992 | Ando | 385/11 |
| 5,101,469 | 3/1992 | Oda | 385/131 |
| 5,151,957 | 9/1992 | Riviere | 385/41 |
| 5,245,465 | 9/1993 | Tomita et al. | 385/11 X |

OTHER PUBLICATIONS

S. T. Peng et al., "Directional Blazing of Waves Guided by Asymmetrical Dielectric Gratings", Optics Communications, vol. 11, No. 4, Aug. 1974, pp. 405–409.

*Primary Examiner*—Brian Healy
*Attorney, Agent, or Firm*—Young & Thompson

[57] ABSTRACT

An optical non-reciprocal circuit is constituted by a channel waveguide, a planar waveguide, and a diffraction lattice or grating. The channel waveguide is disposed in a planar substrate that is transmissive to optical waves. The planar waveguide is disposed on only one side of a substrate plane divided by the channel waveguide in the substrate plane and having an equivalent refractive index lower than that in the channel waveguide. The diffraction grating provides a spatial periodic change of the refractive index to a guided optical wave of the channel waveguide. The periodicity of the lattice direction, that is, the direction of the wavenumber vector is neither parallel nor perpendicular to the optical transmission direction of the channel waveguide but is given a finite angle. The optical non-reciprocal circuit can be realized by using only an ordinary dielectric material with the circuit being highly productive and low priced and having high performance.

8 Claims, 7 Drawing Sheets

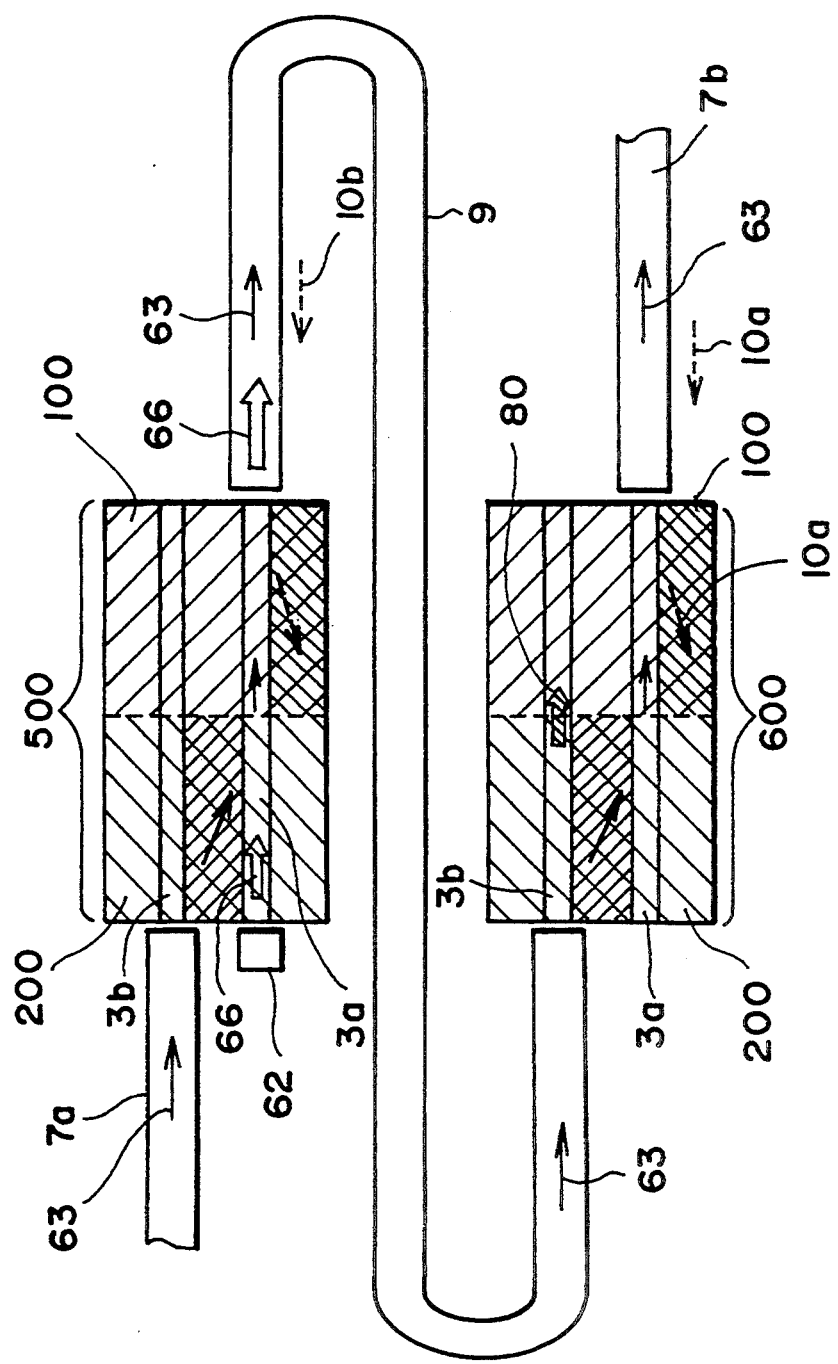

OPTICAL NON-RECIPROCAL CIRCUIT OF WAVEGUIDE TYPE

BACKGROUND OF THE INVENTION (1) Field of the Invention

The present invention relates to a waveguide type optical non-reciprocal circuit that is simple to implement, is low price, has excellent stability, and that does not use optically non-reciprocal material such as magneto-optical material.

(2) Description of the Related Art

The development of ultra long distance optical fiber communication technology trying to cover over ten thousand kilometers using optical fiber amplifiers, or the investigation of a suitable form of optical fiber technology for transmitting integrated system digital service of a wide band-width, including HDTV (High Definition Television), to the terminal of subscribers, is more than ever being strongly investigated as part of the development of high level optical communication technology. In order to realize this kind of system, one of the indispensable optical components is an optical isolator or circulator, inserter, etc., that is, optical non-reciprocal circuits having optical transmission properties with strong directionality. That is, an optical isolator is a component that prevents deterioration of the signal-to-noise (S/N) ratio which occurs due to the light returning from fiber connection points re-entering the semiconductor laser, which is the optical transmission source. The optical circulator or optical inserter is the optical non-reciprocal circuit used in order to input excitation light into the optical fiber amplifier independently of the optical signal at the time when the optical signal is led into the optical fiber amplifier to be amplified.

A widely practically used example of a known form of the composition of an optical isolator is the non-reciprocal polarizing circuit where a magneto-optical crystal exhibiting the Faraday effect is used as 45° polarization rotator. This optical isolator consists of a minimum of four parts, including the magnet, and it necessitates many processing steps in material fabrication and construction, and has poor reliability and stability. Also, more than anything else, in order to insert such an optical isolator en-route into an optical fiber whose optical polarization state is not necessarily constant, the structure must be such that its device characteristics do not vary with polarization, and for this reason, it requires even more parts and complicated optical circuit structures.

A known example of the optical inserter is one in which, in the case where the wavelength of the inserted light and another passive inserted light differ, a wavelength filter constituted by an interference film is introduced, the passive inserted light is transmitted straight through, the inserted light is reflected through 90° by the wavelength filter, and the waves are coupled. Furthermore, in the case where the wavelength of the inserted light and that of the passive inserted light are the same, a structure employing coupling of optical waves by polarization is known. In these examples, the passive inserted light transmitted through the optical fiber is orthogonally polarized and coupled with the inserted light by a polarizing prism. Thus, an optical circulator or an optical inserter has not yet been realized, which is polarization independent, that is, both the inserted light and the passively inserted light move with no relationship to the condition of polarization.

In the aforementioned cases, the optical circuit is constituted by a beam and not by using an optical waveguide, but the situation is the same even in the case where an optical waveguide is used.

SUMMARY OF THE INVENTION

An object of the invention is to overcome the problems existing in the prior art and to realize an optical non-reciprocal circuit of a waveguide type without using special material such as magneto-optical crystals and also without providing an external control means such as magnets, so that the structure and manufacture is simple, and the possibility exists for integration with other optical components such as semiconductor lasers.

In order to achieve the above object, the basic concept of this invention is to use the effect of diffraction by the phase grating of a waveguide which has the optical asymmetry of the optical transmission direction.

According to one aspect of the invention, there is provided an optical non-reciprocal circuit comprising:
 a channel waveguide disposed in a planar substrate;
 a planar waveguide disposed on only one side of a substrate plane divided by the channel waveguide in the substrate plane and having an equivalent refractive index lower than that in the channel waveguide; and
 a means for giving a spatial periodic change of the refractive index to a guided optical wave of the channel waveguide.

According to another aspect of the invention, there is also provided an optical non-reciprocal circuit comprising:
 a plurality of channel waveguides having identical waveguiding properties disposed on a plane substrate, separated to a degree such that they are not optically coupled;
 a planar waveguide, with an equivalent refractive index lower than that in the channel waveguides, disposed only between the channel waveguides; and
 a means for providing a refractive index periodicity variation to a guided wave of the channel waveguide.

According to the invention, by only using an ordinary dielectric material and by devising an optical waveguide structure, without use of magnets or materials having a non-reciprocal effect such as a conventional magneto-optic effect, many types of optical non-reciprocal devices having excellent productivity can be realized. Also, these can be realized using optical semiconductor material, using LSI manufacturing technology, with possible integration with semiconductor laser structures, and a low priced, optical non-reciprocal circuit, with little optical loss, and no necessity to adjust optical combination can be realized.

BRIEF DESCRIPTION OF THE DRAWINGS

The above and other objects, features and advantages of the present invention will be apparent from the following description of preferred embodiments of the invention explained with reference to the accompanying drawings, in which:

FIG. 6 is a diagrammatic plan view showing a composition of an optical inserter as a fourth embodiment according to the invention.

PREFERRED EMBODIMENTS OF THE INVENTION

Now, preferred embodiments of the invention are explained with reference to the drawings.

Figure 1A:
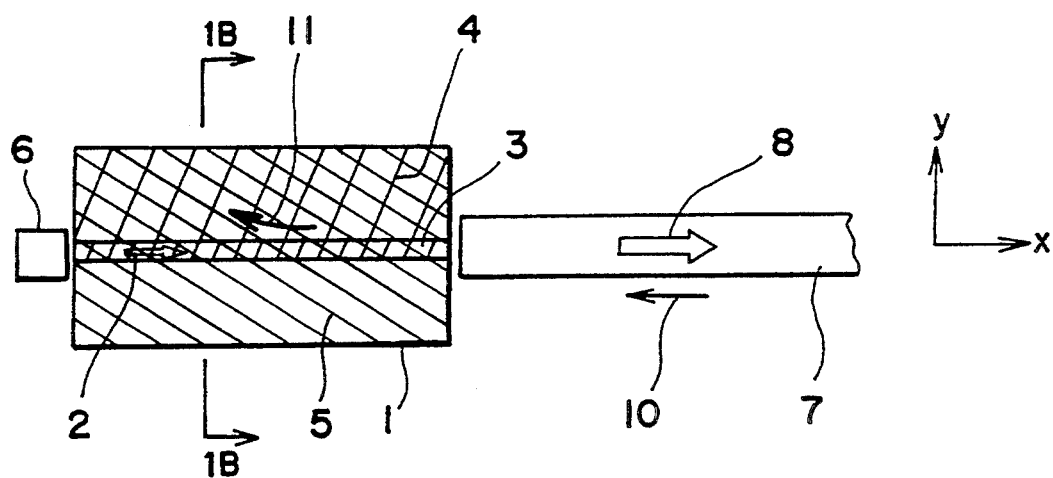
FIG. 1A is a diagrammatic plan view showing a composition of an optical isolator as a first embodiment according to the invention.
Figure 1B:
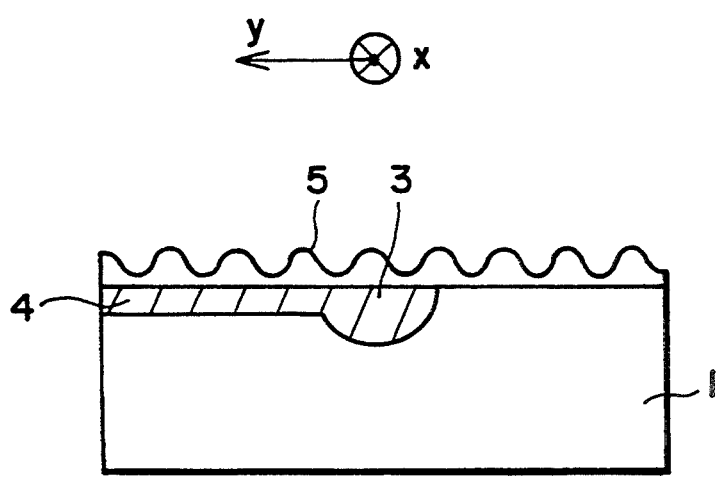
FIG. 1B is a diagrammatic sectional view of a substrate of the isolator taken along a line 1B—1B in FIG. 1A.

FIGS. 1A and 1B show an example of a composition of an isolator as the first embodiment of this invention. FIG. 1A is a diagrammatic plan view thereof and FIG. 1B is a diagrammatic cross-sectional view of a substrate 1 of the isolator taken along a line 1B—1B in FIG. 1A.

On the surface of a dielectric substrate 1, for example, glass that is transmissive to optical waves, there are formed, by using one of the effective waveguide formation methods such as an ion exchange method, a channel waveguide 3 and a planar waveguide 4 which is provided on only one half of the substrate in the optical transmission direction of the channel waveguide and which has a refractive index lower than that in the aforementioned channel 3. Then, there is provided a diffraction lattice (grating) 5 extending over the whole surface of the substrate 1. The direction of the periodicity of the lattice, that is, the direction of the wavenumber vector of the lattice is neither parallel (0°) nor perpendicular (90°) to the optical transmission direction of the channel 3 but is given a finite angle.

The substrate 1 is optically polished at both ends, and is orthogonal to the channel waveguide 3. A semiconductor laser 6 is connected at one of these end planes, the oscillating light of the semiconductor laser 6 from one end of the channel waveguide 3 is led into the channel waveguide as channel guided wave light 2, an optical fiber 7 is connected to the other end of the channel waveguide, and the emitted light is waveguided into the optical fiber 7 as emitted light 8. The slight returning light 10, returning from connections or crystal defect points in the optical fiber 7, is re-injected into the channel waveguide 3. This light goes along channel waveguide 3, not returning to the semiconductor laser 6. It is diffracted by the grating 5, becoming planar waveguide radiation 11, and is radiated within the planar waveguide 4 without returning to the semiconductor laser 6. That is, an optical isolator function can be realized. Also, the reason that the equivalent refractive index of the planar waveguide is made lower than that of the channel waveguide is in order to confine the channel guided wave inside the channel waveguide, and to prevent it spreading into the planar waveguide.

Figure 2:
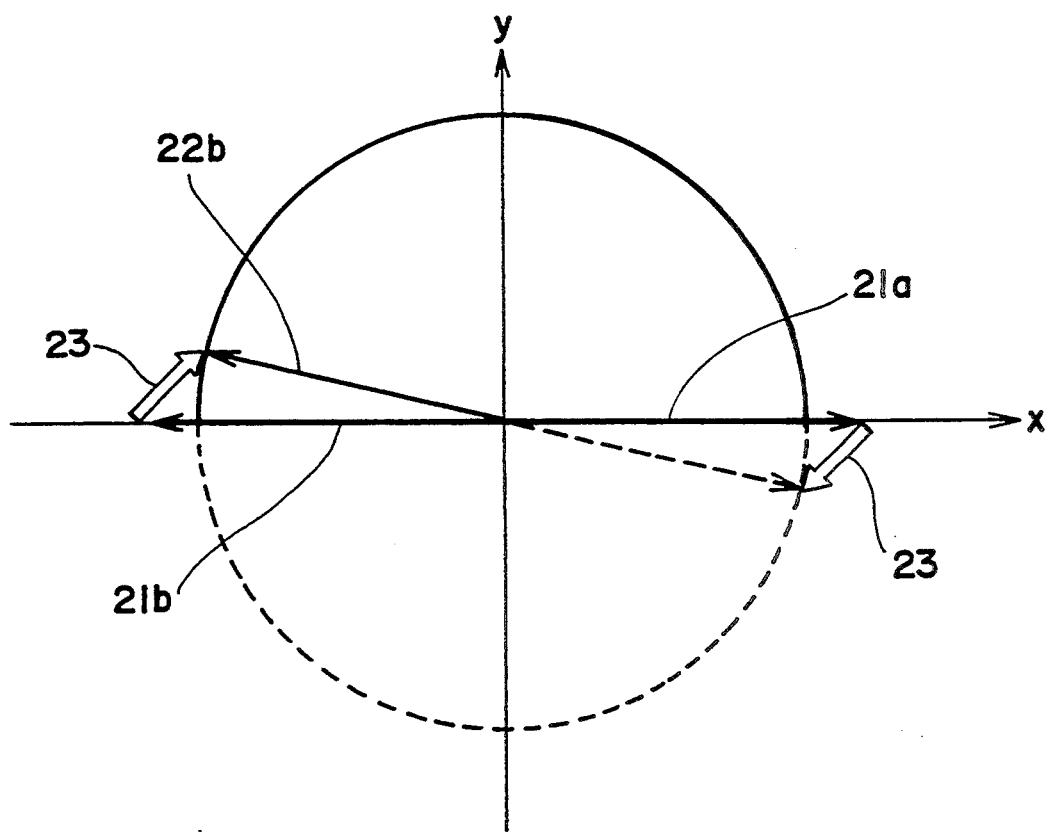
FIG. 2 is a diagram for explaining the operating principle of the isolator of the first embodiment shown in FIGS. 1A and 1B.

The principle of how the aforementioned non-reciprocal effect is realized by simply using a dielectric material, and without use of non-reciprocal material such as magneto-optical crystals, can be explained as below. FIG. 2 is used in order to understand the behavior of the propagating wave of the structure of FIGS. 1A and 1B, and shows the matching relationship of the wavenumber vector between the traveling wave and lattice in the xy plane of the substrate surface. The wavenumber vector of the input channel guided wave 2 is shown by the wavenumber vector 21a along the x-axis direction for x>0. The vector of the grating 5 is shown by the wavenumber vector 23. In FIGS. 1A and 1B, because a planar waveguide is not formed on the surface of y<0, a triangular wavenumber vector, formed to be closed between the wavenumber vector 21a of the input channel guided wave and wavenumber vector 23 of the grating, does not exist. That is, the matching condition is not satisfied, and the input channel guided wave 2 in FIG. 1A does not undergo diffraction from the grating 5 and advances along the channel waveguide 3. On the other hand, the wave vector of the returning light 10, traveling in the channel waveguide for x<0, can be shown as 21b in FIG. 2. As in FIGS. 1A and 1B, because a planar waveguide 4 was formed in the surface of only y>0, for the half plane of y≧0 in FIG. 2, a traveling wave of the planar waveguide 4 exists as shown by the solid line semi-circle in FIG. 2. Due to this, the wavenumber vector 21b advancing in the x<0 direction in the channel waveguide 3 forms a closed triangle between the wavenumber vector 22b transmitting the planar waveguide 4 and the wavenumber vector 23 formed by the grating 5. That is, the returning optical light 10 advancing in the x<0 direction along the channel waveguide 3 is diffracted by the grating 5, and is transformed into planar waveguide radiation light, and thus does not return to the semiconductor laser 6. In this way, in FIGS. 1A and 1B, the channel guided wave pointing in the x>0 direction advances straight along the waveguide, and the channel guided wave pointing in the x<0 direction comes out of the channel waveguide and is released as a planar guided wave. This has thus realized non-reciprocity of transmission characteristics.

For example, in the case of light of wavelength $\lambda = 1.3$ μm, using a glass substrate of refractive index 1.45, by giving ion exchange to this substrate such that the waveguide section refractive index is approximately 1.55, the thickness of the channel waveguide section 3 is 2 μm, the thickness of the planar waveguide section 4 is 0.8 μm, then both of the waveguides become single mode waveguides, and then if the angle formed relative to the grating 5 provided on top of the waveguide is 46°, and the grating periodicity is set at $\Lambda = 15$ μm, then the planar waveguide light 11 will be radiated at an angle of 2.5° relative to the x axis. If the device length L is made to be about 1 mm, as is often studied in traditional optical theory, then for the aforementioned structure, the Klein=Cook parameter ($Q = 2\pi L\lambda/\Lambda^2$) will become greater than 25, and it will be diffracted due to a thick lattice. Because of this, the diffraction efficiency of the grating is suitably determined by the fabrication conditions, such as distance between the waveguide and grating, or grating depth, so as to be $\pi \Delta nL/\lambda = 2\pi$, and if the change in the refractive index Δn undergone by the guided wave light by the grating is suitably chosen, then the diffraction efficiency will be 100%.

In order to increase conventional device fabrication yield, it is necessary to give redundance in its design. In order to absorb fluctuations in optical wavelength, waveguide refractive index, waveguide thickness etc., methods that may be considered include, establishing a chirped grating periodicity, diversing the angle formed between the grating and channel waveguide into optical transmission directions, and giving the grating periodicity or waveguide curvature.

Also recently, growth technology for growing optical semiconductor crystals has advanced, it has become possible to constitute grown layers having different band-gap compositions within a single substrate surface by using selective epitaxy technology. By using this technology, it is possible to monolithically constitute semiconductor lasers and the optical isolator of the aforementioned principle. That is, an optical isolator attached to a semiconductor laser can be realized by connecting the optically active section of a DFB (Distributed Feedback) or DBR (Distributed Bragg Reflector) laser and the waveguide channel of the optical isolator of the aforementioned structure such that they are connected tandemly to the direction of light progress.

Figure 3A:
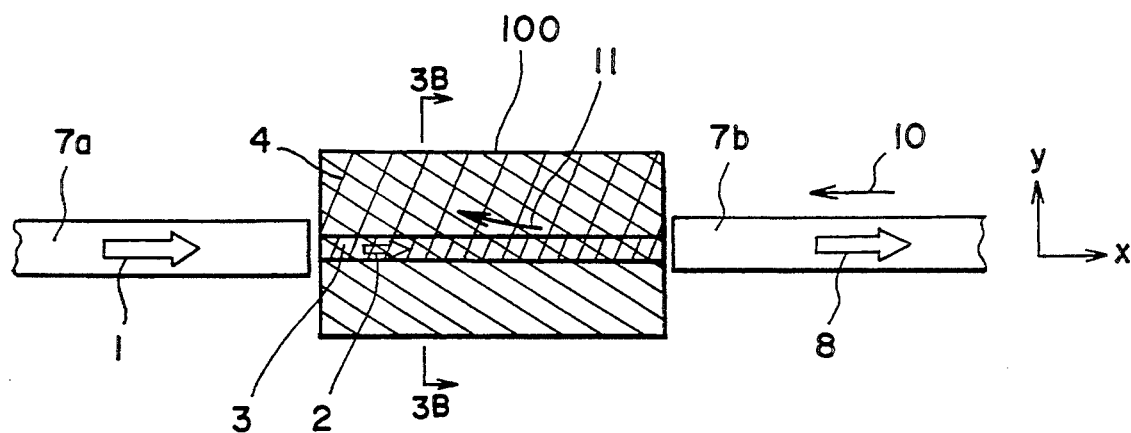
FIG. 3A is a diagrammatic sectional view showing a composition of an optical isolator as a second embodiment according to the invention.
Figure 3B:
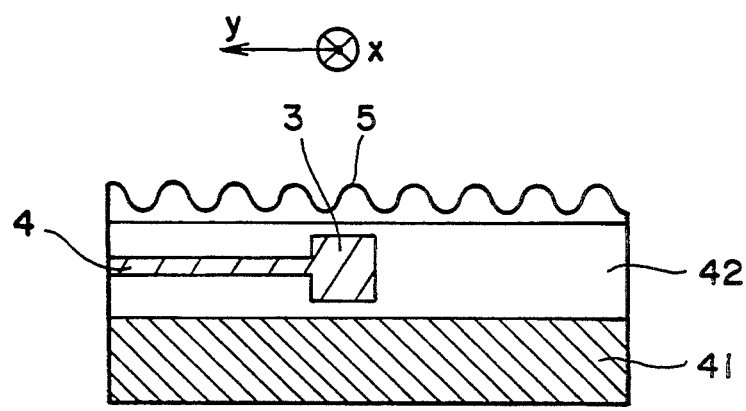
FIG. 3B is a diagram showing a cross-section of a substrate of the isolator taken along a line 3B—3B in FIG. 3A.

FIGS. 3A and 3B relate to a second embodiment which is based on the same principle as the first embodiment, and show a configuration of a polarization independent optical isolator. FIG. 3A is a plan view thereof and FIG. 3B is a cross-sectional view of the waveguide taken along a line 3B—3B in FIG. 3A.

Generally, the polarized light of the optical wave inside a single mode optical fiber used for communication applications, is in an elliptically polarized condition. Due to this, for practical use, in order to insert an isolator for stopping returning light into an optical fiber, the isolator characteristics have to be independent of polarization. In particular, in the case of an optical fiber amplifier, which is used with an isolator connected to both ends, it is necessary to suppress the amplification of the returning light 10, and this is why it is essential for the isolator to have polarization independent characteristics.

FIG. 3A shows an optical isolator 100 of the same basic principle as the first embodiment. It is a structure which has a square shaped channel waveguide 3 and a planar waveguide buried in a cladding layer 42 which is constituted on a silicon substrate 41. The grating 5 of the cladding layer is constituted in the same way as the previous embodiment. An input light fiber 7a is connected to the input light end and an exit light fiber 7b is connected to the output light end. When used together with an optical fiber amplifier, the composition becomes such that, in the case of the light input side of the optical light amplifier, the exit light fiber 7b is for the amplifier fiber, and in the case of the output side, the input light fiber 7a is for the amplifier fiber.

One example of a waveguide structure for making a polarization independent optical isolator, is as constituted in FIG. 3B. That is, the phase velocity of two orthogonal modes (Eyy mode and Ezz mode) traveling along the channel waveguide 3 is almost degenerated, thus the shapes are made so as to be identical and the cross sectional form of the channel 3 is made so as to a square. The structure of such forms has already been accomplished by $SiO_2$ waveguide type technology.

Since the two modes traveling through the channel waveguide 3 are degenerated and have identical form, the two modes satisfy the same phase matching conditions as in the grating 5, and also they are both diffracted by the grating equally strongly. For this reason, polarization independent characteristics can be obtained.

As explained in the example of the first embodiment, by giving the channel waveguide and grating redundancy, any slight differences in the polarization due to disparities from the square form of the channel waveguide during fabrication can be absorbed.

Apart from the fiber type, there is a method for realizing an optical amplifier in the semiconductor laser amplifier that uses the optical amplification characteristics of the semiconductor laser, where the reflectivity is made extremely small by providing an anti-reflective film at the end plane and optical amplification is carried out by removing the oscillation condition. As explained in the first embodiment of the invention for the monolithic integration of a DFB or DBR laser and the optical isolator according to the invention, a good semiconductor laser optical amplifier can be realized by monolithic integration of a structure where a semiconductor optical amplifier that does not possess an optical reflection mechanism is inserted in between two optical isolators of this embodiment which are at both sides of the semiconductor optical amplifier.

Figure 4:
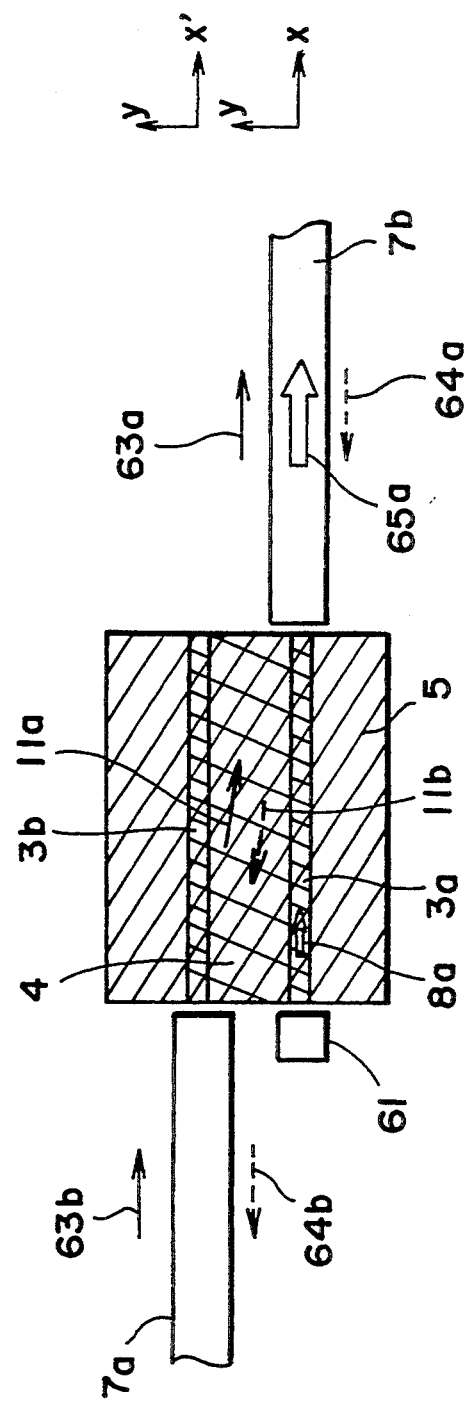
FIG. 4 is a diagrammatic plan view showing a composition of an optical inserter as a third embodiment according to the invention.

FIG. 4 shows in a plan view an optical inserter, which is the third embodiment of this invention. On a dielectric substrate, two parallel channel optical waveguides 3a, 3b, having identical optical propagation characteristics, are constituted, a planar waveguide 4, having lower equivalent refractive index than the channel waveguides, has been constituted between them, and a grating 5 is provided over the whole substrate as in the previous embodiment. For one of the end planes of one of the channel optical waveguides 3a, an output optical fiber 7b is connected to the waveguide end plane of the substrate end plane side on the opposite side to that of the input light fiber 7a. On the waveguide plane that is opposite to this, a semiconductor laser 61 is connected to the end plane in order to insert a new optical signal into the output light fiber 7b.

The ascending signal light 63b that has traveled along the input light fiber 7a from −x′ direction to +x′ direction, enters the channel waveguide 3b and advances along it. As it propagates, it is diffracted by the grating 5, is transformed 100% to an ascending guided wave 11a, and propagates along the planar waveguide 4 towards the bottom right in the figure. As the ascending planar guided wave 11a propagates along the planar waveguide 4, it comes across another channel waveguide 3a. The ascending planar guided wave 11a is here diffracted by the grating 5, and next becomes a channel guided wave traveling along the channel waveguide 3a towards the right in the figure, and is guided as the ascending signal light 63a traveling in the +x direction along the output light fiber 7b connected to this end of the waveguide end plane.

Conversely, the ascending optical signal 64a that has traveled along the output fiber 7b from the +x to −x direction in the figure, passes into the channel waveguide 3a and progresses in the −x direction. It is diffracted by the grating 5 as it progresses, is 100% transformed into the descending planar guided wave 11b, propagates along the planar waveguide 4 towards the upper left in the figure, and does not go towards the semiconductor laser 61. As the descending planar guided wave 11b travels along the planar waveguide 4, it comes across another channel waveguide 3b. The descending planar guided wave 11b is even here diffracted by the grating 5, becomes a channel guided wave progressing along the channel waveguide 3b in the −x′ direction towards the left in the figure, and is guided as a descending signal light 64b traveling in the −x′ direction along the input optical fiber 7a connected to this end of the waveguide end plane.

The emitted light of the semiconductor laser connected to the end plane on the opposite side of the emitted light fiber 7b connected to the channel waveguide 3a becomes the ascending inserted channel guided wave 8a, it advances along the channel waveguide 3a in the right hand +x direction, and is led as the ascending inserted light 65a inside of the connected emitted light fiber 7b.

In spite of the insertion of this inserter between the input light fiber 7a and the output light fiber 7b, the ascending and descending signals are absolutely bi-directional, and in principle there is no loss. In addition, if this optical inserter is introduced, then as expected, the signal of the semiconductor laser 61 can be inserted into the optical fiber 7b as a new ascending inserted signal without any losses.

Figure 5A:
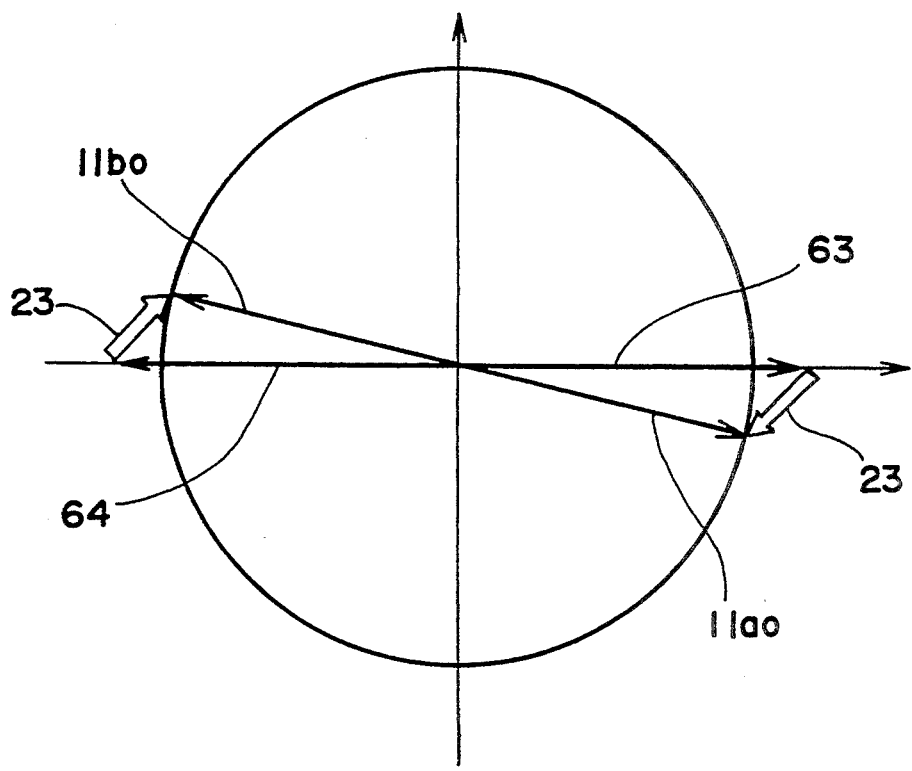
FIGS. 5A and 5B are diagrams for explaining the operating principle of the inserter of the third embodiment shown in FIG. 4.
Figure 5B:
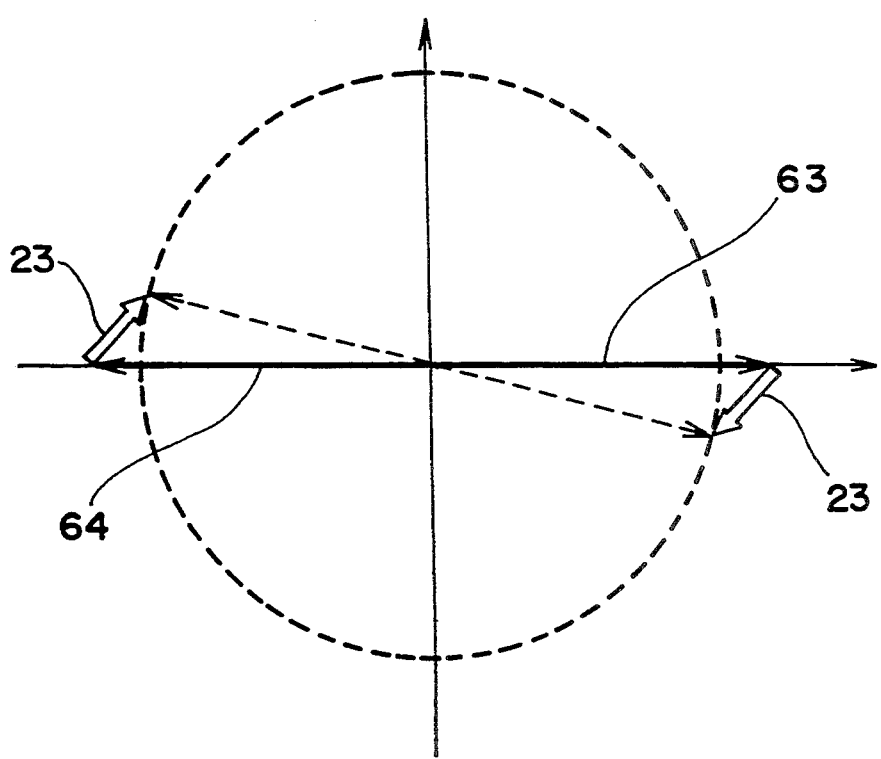

FIGS. 5A and 5B illustrate the phase matching conditions as in the operating principle of the aforementioned first embodiment, where FIG. 5A shows the conditions of the combined regions of the channel waveguides 3a, 3b and the planar the waveguide 4 in FIG. 4, and FIG. 5B shows the conditions not including the outside region of the channel waveguide of the planar waveguide 4. As shown in FIG. 5A, the channel waveguide ascending signal light wavenumber vector 63, and descending signal light wavenumber vector 64, become phase matched with each of the ascending, descending, planar guided light wavenumber vectors 11a0, 11b0 by interacting with the grating wavenumber vector 23. For the region not including the planar waveguide 4 on the outside of one of the channel waveguides, because a matching planar guided light mode does not exist, the ascending, descending, channel guided waves are diffracted by the grating and are not transformed as radiated light into this region. That is, in FIG. 4, the signal light 63b advancing in the +x′ direction along 3b (wavenumber vector 63 of FIG. 5) is transformed 100% into the ascending planar guided wave 11a by the grating, and it is not diffracted in the region where the planar waveguide 4 not satisfying phase matching conditions does not exist. Due to the materialization (right half of FIG. 5) of the same phase matching conditions as in the channel waveguide 3b, the planar guided wave 11a that has arrived at the channel waveguide 3a is diffracted by the grating, transformed into ascending signal light 63a, transmitted through the channel waveguide 3a, and is not radiated in a region where the planar waveguide does not exist. As for the descending signal light 64a, the same behavior as the ascending signal can be inferred from the phase matching conditions as shown in the bottom left half side of FIG. 5A. The phase matching condition of an inserted channel guided wave 8a newly injected into the channel 3a from the laser 61, as shown in the right half side of FIG. 5B, is such that it solely advances straight along the channel waveguide 3a, and is emitted after becoming ascending inserted light 65a in the output optical fiber 7b because a propagation mode does not exist after intervention of the grating vector 23.

In the aforementioned explanation, the case of an optical inserter which inserts a new and different signal en-route to optical signals going to and fro in an optical fiber was described. If an optical receiver is provided instead of an input optical fiber 7a, the descending signal wave 64a is led by the optical receiver, the ascending inserted light does not go to the optical receiver, is injected into the output optical fiber 7b, realizes the optical circulator function, and operates as an optical transmitter/receiver terminal. At this time, the wavelength of the laser 61 for the ascending signal inserter and the wavelength of the descending signal light 64a do not have to be different, and ascending/descending can be distinguished even if they have the same wavelengths.

Furthermore, if a separate laser is connected to the end plane 61, that is opposite to the end plane where the input optical fiber 7a is connected to the channel waveguide 3b, a new signal in the form of the descending inserted light can be inserted into the input optical fiber 7a in addition to the previously mentioned ascending insert light to the output optical fiber 7b.

As described with respect to the second embodiment, it is possible to fabricate the optical inserter, semiconductor laser, optical detector described here by monolithic integration.

Thus, one example of polarization independence can be realized by constituting a degenerate channel waveguide structure such as shown in FIG. 3B. Also, the integrity of the device characteristics against variations in input wavelength distribution or undulation, can be realized as described in the first embodiment by giving curvature or chirping to the grating.

FIG. 6 shows a fourth embodiment of the invention, which realizes an excitation optical inserter of an optical fiber amplifier by integrating the function of the optical isolator of the second embodiment and the optical inserter of the third embodiment.

The optical fiber amplifier functions so as to inject excitation light of wavelength 1.48 $\mu$m or 0.98 $\mu$m into optical fibers whose core section is doped with such rare earth transition metals as Er (Erbium) and to amplify a propagating, weakened 1.55 $\mu$m band optical signal, that has traveled in optical fibers, by as much as 20~30 dB, still in the form of light. For the amplifier to function well, it is necessary, in addition to the amplifying optical fiber, to have an optical isolator and a wavelength filter. The optical isolator is inserted in one or both ends of the amplifying optical fiber so that the optical fiber transmission signal and the oscillating light signal of a semiconductor laser that is used as an excitation source, are both coupled without undergoing any losses, and so that the reflected light, traveling in the opposite direction to the light signal and the optical coupling circuit used for injection from the end plane of the amplifying optical fiber, is not amplified by the amplifier and the reflected amplified light does not return and travel along the transmission line. The wavelength filter transmits only the signal wavelength to the output side of the amplifying optical fiber, in order to stop the injection of signal light, that has been mixed with strong intensity excitation light, into the transmission line. All these components are required to have polarization independence.

Conventional circuits of this type consist of a polarization wave separator using an interference filter between a collimator lens for collimating the output light from the transmission fiber and a focussing lens for concentrating light into the amplifying fiber, a 45 degree Faraday rotator provided for each polarization wavelength, a polarization independent optical isolator made by using couplers for recoupling respective rotated polarized waves, and a coupler for coupling the light signal and excitation light, made by using a wavelength filter. Increase in the number of parts and in costs in accompanying parts, costs in adjustments, lack of reliability and stability, etc. are industrial problems that have accumulated.

FIG. 6 is a plan view of a configuration of an optical fiber amplifier module, which comprises an amplifying optical fiber 9, an input side circuit 500, and an output side circuit 600. The input side circuit 500 has a composite integrated function as for combining an optical signal 63 that has propagated from the input optical fiber 7a and an oscillation light 66 of the excitation semiconductor laser 62 and also for an optical isolating for stopping oppositely flowing light 10b from the amplifying optical fiber. The output side circuit 600 has a composite integrated function as for filtering only the optical signal that has been amplified by the optical amplifying fiber 9 and for preventing the returning light 10a from the output optical fiber 7b from flowing into the amplifier.

The function of coupling the light signal 63 from the input side circuit 500 and the oscillating light 66 from the excitation laser 62 is realized by the optical inserter 200 as described in the third embodiment, the isolator function is achieved by the optical isolator 100 as described in the second embodiment, and these are achieved by an integrated arrangement in tandem to the advancing direction of light as in the drawings.

The wavelength amplified by the optical fiber amplifier is restricted by the energy level of the rare earth atom added and, for example, in the case of Er, it is determined to be 1.535 or 1.552 μm. Thus, the function of filtering only the optical signal 63 of the output side circuit 600 can be realized by constituting the grating of the inserter 200 in the third embodiment, with a sharp single period lattice suitable for the above wavelength. That is, in the light combined in one of the channel waveguides 3b, of the optical inserter 200, only the wavelength of the light signal 63 is diffracted by the grating, it is guided to the other channel waveguide 3a arranged in parallel, and the noise light 80 of wavelengths other than the amplifier light signal, advances as it is, along the channel waveguide and can be prevented from being combined with the output side. Furthermore, the isolation function can be realized by the optical isolator 100 as described in the second embodiment. Hence, in the same way as the input side circuit 500, the function of the output side circuit 600 can be achieved by integrating the optical inserter 200 and optical isolator 100 such that they are connected tandemly to the advancing direction of the light.

Also, as a supplement to FIGS. 3A and 3B, the structure of the optical isolator of the output side circuit is such that the region where the planar waveguide does not exist is provided with an additional single channel waveguide at the position for connecting the channel waveguide 3b of the optical isolator. A noise wave 80 advances through this channel waveguide and is exhausted.

It is possible to monolithically integrate the input side circuit 500 and excitation laser 62 of this embodiment by using optical semiconductor crystal growth technology and processing technology, in the same way as described in the other embodiments.

The optical inserter of the third embodiment has the function of combining two light waves without loss, namely, the optical signal 63b of the input optical fiber 7a and the output light 8a of the signal inserter laser 61, into the output optical fiber 7b. If this scale is expanded, an optical non-reciprocal circuit can be realized where many optical signals can be combined into one channel waveguide without any loss. Such an optical non-reciprocal circuit has uses as a coupler for wavelength multiplexing using multi-wavelengths for transmission optical sources or, for energy applications, as a coupler for multi-summation of the output of a semiconductor laser that does not have a large output.

Figure 7:
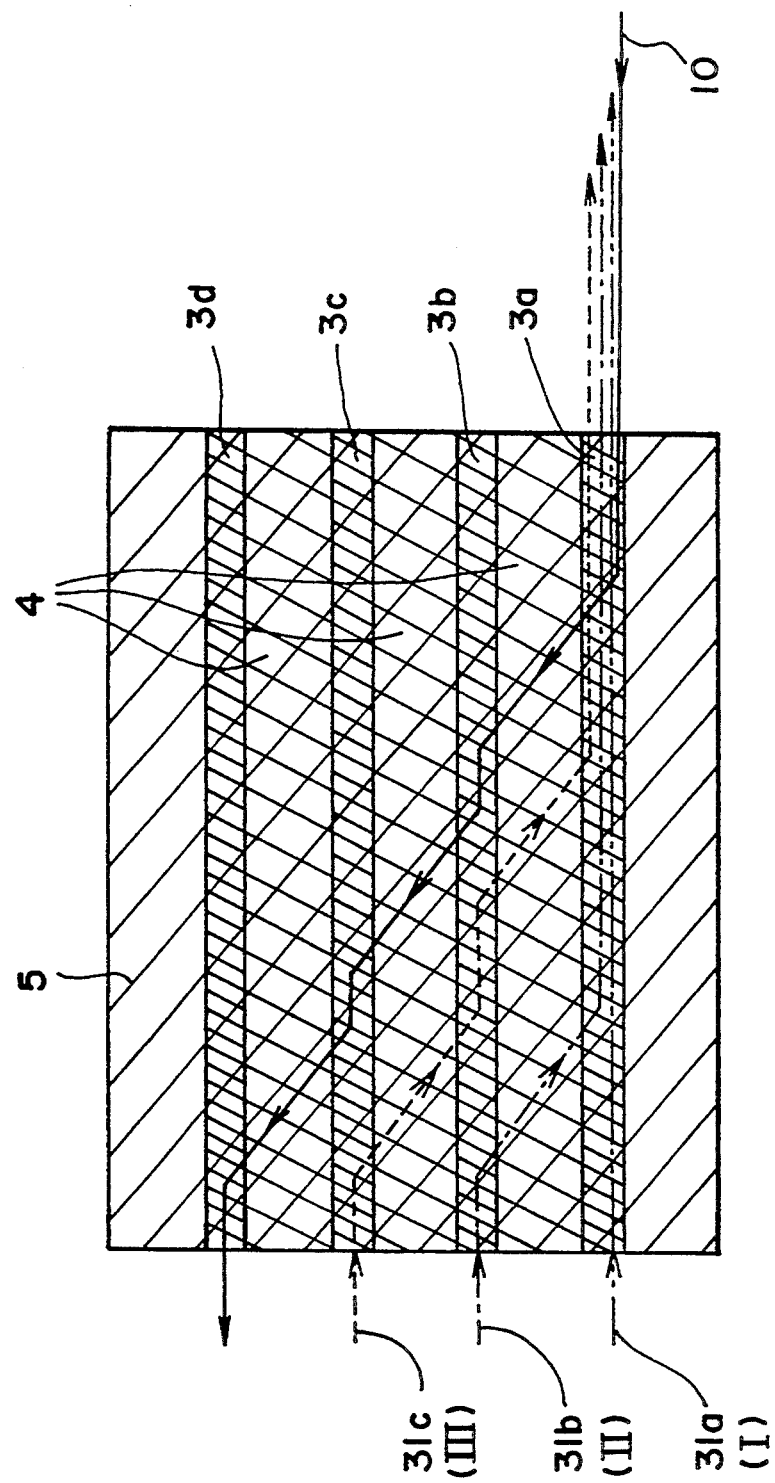
FIG. 7 is a diagrammatic plan view showing an optical coupler as a fifth embodiment according to the invention, in which the optical inserter of the third embodiment is taken as a basic unit.

FIG. 7 shows, as a fifth embodiment of the invention, an optical coupler in which the optical inserter of the third embodiment constitutes a basic unit and is integrated to line up in parallel to the channel waveguides. Only between the channel waveguides I–IV which are from 3a to 3d and which have the same propagation characteristics, there are formed planar waveguides 4 of an equivalent refractive index smaller than in such channel waveguides and, as in the previous embodiments, the grating 5 is provided on the whole surface.

As explained for the operation (FIG. 4) of the third embodiment, the input light I31a inputted into the channel waveguide I of 3a advances along said channel I and exits the channel. The input light II31b that is inputted into channel II of 3b, is diffracted by the grating 5, is transformed into to a guided wave of the planar waveguide between the channel waveguide II3b and the channel waveguide I3a, advances to the right bottom slope, comes across the channel waveguide I3a, is diffracted by the grating 5, becomes the channel guided wave of the channel waveguide I3a, combines with input light I, advances along the channel waveguide I and exits the channel. In the same way, the input light III31c inputted into the channel waveguide III of 3c, is diffracted by the grating 5, goes through the channel II3b and becomes the channel guided wave of the channel waveguide I3, couples with input light I or input light II, advances along the channel waveguide I, and exits the waveguide. That is, input light I–III can be coupled in a single channel waveguide.

On the other hand, the returning light 10, advances in any of the aforementioned I—III, without returning to the various optical sources, advancing from the channel waveguide I to the extreme opposite channel waveguide IV3d. The channel waveguide IV3d has the planar waveguide 4 only on one side of the channel, and because it does not have one on the other side, it does not have a wave mode matching condition due the grating, and the light advances along the channel waveguide and exits out of the waveguide.

Thus, a multi-wave coupler that does not vary with polarization, combines without losses, and the possibility of removing returning light can be realized.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical non-reciprocal circuit comprising:
a channel waveguide disposed in a planar substrate;

a planar waveguide disposed on only one side of a substrate plane divided by said channel waveguide in the substrate plane and having an equivalent refractive index lower than that in said channel waveguide; and a means for giving a spatial periodic change of the refractive index to a guided optical wave of said channel waveguide.

2. An optical non-reciprocal circuit comprising:

a plurality of channel waveguides having identical waveguiding properties disposed on a plane substrate, separated to a degree such that they are not optically coupled;

a planar waveguide, with an equivalent refractive index lower than that in said channel waveguides, disposed only between the channel waveguides; and a means for providing a refractive index periodicity variation to a guided wave of said channel waveguide.

3. An optical non-reciprocal circuit in which a circuit having function as an optical isolator and a circuit having function as an optical inserter are serially connected and integrated on a single substrate, said circuit functioning as the isolator comprising:

a channel waveguide disposed in a planar substrate;

a planar waveguide disposed on only one side of a substrate plane divided by said channel waveguide in the substrate plane and having an equivalent refractive index lower than that in said channel waveguide; and a means for giving a spatial periodic change of the refractive index to a guided optical wave of said channel waveguide, and said circuit functioning as the optical inserter comprising:

a plurality of channel waveguides having identical waveguiding properties disposed on a plane substrate, separated to a degree such that they are not optically coupled;

a planar waveguide, with an equivalent refractive index lower than that in said channel waveguides, disposed only between the channel waveguides; and a means for providing a refractive index periodicity variation to a guided wave of said channel waveguide.

4. An optical non-reciprocal circuit comprising:
an optical non-reciprocal circuit according to claim 1 and a semiconductor laser which are integrated on a single optical semiconductor substrate.

5. An optical non-reciprocal circuit comprising:
an optical non-reciprocal circuit according to claim 2 and a semiconductor laser which are integrated on a single optical semiconductor substrate.

6. An optical non-reciprocal circuit comprising:
an optical non-reciprocal circuit according to claim 3 and a semiconductor laser which are integrated on a single optical semiconductor substrate.

7. The optical non-reciprocal circuit according to claim 1, in which said channel waveguide is square shaped in its cross section and is disposed in a cladding layer formed on a silicon substrate.

8. The optical non-reciprocal circuit according to claim 1, in which said means for giving a spatial periodic change comprises a diffraction lattice which extends over the whole surface of the substrate and in which a wavenumber vector is directed neither parallel nor perpendicular to an optical transmission direction of said channel waveguide but is given a finite angle.

* * * * *